UNITED STATES PATENT OFFICE.

JACOB S. ROBESON, OF AU SABLE FORKS, NEW YORK.

PLASTIC AND PLASTIC COMPOSITION AND PROCESS OF MAKING SAME.

1,069,031. Specification of Letters Patent. Patented July 29, 1913.

No Drawing. Application filed October 5, 1911. Serial No. 653,040. Renewed February 6, 1913. Serial No. 746,669.

*To all whom it may concern:*

Be it known that I, JACOB S. ROBESON, a citizen of the United States, residing at Au Sable Forks, in the county of Essex and State of New York, have invented certain new and useful Improvements in Plastics and Plastic Compositions and Processes of Making Same, of which the following is a specification.

This invention relates to plastics and plastic compositions and process of making same; and it comprises a composition of matter comprising a mixture of sulfite waste liquor, best in concentrated undecomposed form, and a plastic argillaceous material of substantially neutral character, such as kaolin or any plastic clay, in finely divided condition, the mixture being advantageously in such proportions as to produce a pulpy mass, the said mixture being either alone or commingled with material united thereby as in a shaped article and it also comprises processes of making such composition; all as more fully hereinafter set forth and as claimed.

Sulfite waste liquor is a waste product obtained in large quantities from the manufacture of paper pulp by the so-called sulfite process in which wood or the like is heated in a digester with a solution containing bisulfites, such as bisulfites of calcium or a mixture of the bisulfites of calcium and magnesium, with more or less free sulfurous acid until the soluble or non-cellulosic constituents of the wood, usually included under the broad term "lignones", are dissolved from the wood, leaving substantially pure cellulose as a residue. The character of the soluble compounds formed by the interaction of the lignones and the sulfites of the solvent during the digestion has not been fully determined, but the compounds are commonly considered to be in the nature of lignosulfonates of the bases employed and are ordinarily so called for convenience of terminology.

The sulfite waste liquor as it comes from the digesters is a rather dilute solution of the lignosulfonates and its specific gravity is low. It is also slightly acid in reaction. Attempts have been made to utilize the liquor in this form as an adhesive, for example, as a binder in making sand cores for foundry purposes, fuel briquets, etc. But the dilute, untreated liquor has been found to possess rather a low value as a binder by itself. Molded articles made by its use are hardly strong enough for practical purposes. By neutralizing and concentrating the dilute sulfite waste liquor according to the process disclosed in Patent 833,634, however, a denser solution is obtained which is decidedly glutinous in character and possesses much more valuable adhesive properties. This concentrated material serves excellently as a binder for briquets, cores, etc., as disclosed in Patent 947,128. The exact nature of the change produced in raw waste sulfite liquor by neutralization and concentration is not fully understood. Apparently the change is physical rather than chemical; at least there seems to be no decomposition of the organic compounds originally present, though there may possibly occur something in the nature of a polymerization, but there is a decided increase in the cementing value; the contained matters are much better binders. The concentrated liquor possesses positive adhesive properties. This may be due in part to a colloiding effect produced by the neutralization and subsequent treatment of the raw liquor. That some such explanation is true is evidenced by the fact that the concentrated product still retains its distinctive adhesive properties even when rediluted to the density of the raw liquor.

I have discovered that the colloid properties and adhesive and binding powers of concentrated sulfite waste liquor can be greatly increased by mixing or pulping therewith plastic clay, kaolin, or other similar argillaceous material in very finely divided condition. Clay, kaolin and similar plastic argillaceous materials are substantially neutral or indifferent materials and the chemical or physical actions involved in this heightening of the binding power do not seem to depend in any way on the presence of highly reactive acid or basic bodies. Clay itself has some effect as a binder, but the binding power of the combination of clay and concentrated liquor is far greater than the sum of their individual binding powers. In other words, the increase in the adhesive effect is not merely additive. For example, a test briquet made up of sand to which had been added certain percentages of concentrated liquor and clay and which had been baked at the proper temperature, showed a tensile strength of 26 pounds. A similar briquet containing the same percentage of the liquor as before, but no clay, tested 5½ pounds. A third similar briquet made up with the same percentage of clay as in the first briquet, but containing no sulfite liquor, had a tensile strength of 1 pound. If the effect of mixing the clay and liquor were simply additive, then the first briquet should have shown not much more than 6½ pounds tensile strength; while as a matter of fact it showed 19½ pounds more than this. Furthermore in briquets thus prepared it has been observed that the binder is distributed uniformly through the body of the briquet; not localized in different parts as is apt to occur to a greater or less extent where clay is not employed in conjunction with the sulfite liquor. Apparently the natures of both the clay and the glutin have been so changed that they are enabled to permeate the whole mass of inert material composing the core or other molded article, without separation or localization. This effect may be due to a mutual colloiding action between the clay and the glutin. Tannin is known to have a colloiding action on clay; and it is probable that concentrated sulfite liquor, which although it may not contain true tannin has a tanning action, has a similar influence. As before noted, the liquor itself may be assumed to be somewhat colloidal in character, and this characteristic very likely becomes very much more pronounced in the presence of clay. Whatever may be the real explanation of the phenomenon, the fact remains that the addition of clay to sulfite liquor gives a binder having a strength far in excess of that which could be predicted from the binding powers of the separate or unmixed materials.

While concentrated sulfite liquor is best suited for preparing the adhesive composition of the present invention, I find that the addition of clay to the unconcentrated liquor, especially if the latter has been neutralized or made slightly basic as by treatment with lime or other suitable neutralizing agent, confers decided adhesive and binding properties on the dilute liquor. The product thus obtained is not ordinarily as desirable as that first described, though it is useful for some purposes. In adding lime no excess over the amount necessary to neutralize or render slightly basic should be employed since such an excess precipitates out the sulfite liquor constituents.

In preparing a composition suitable for use as a binder for sand cores in foundry work, a mixture of equal volumes of concentrated liquor and kaolin or clay, thoroughly commingled and incorporated with sufficient water to yield a fluent mixture, yields a paste or pulp which remains homogeneous even after long standing, substantially no separation of the constituents occurring. This lack of separation is probably due to the mutual reaction of the components. This paste may be diluted as desired and mixed with the core sand in varying proportions according to the strength of core required. Other proportions of clay and liquor are of course permissible; in fact there appears to be hardly any limit to the possible range of mixtures which can be made to give a strong binder. But for said cores and like purposes, equal proportions of waste sulfite liquor and clay, diluted with water to the desired extent, give advantageous results. For core compounds however it is not desirable to use too much clay; an excess is apt to cause difficulty in casting operations. Very small quantities of clay have a marked effect and produce disproportionate increase in binding strength. Thus in one test it was found that a sand core containing one-fourth of one per cent. of clay and about two per cent. of concentrated liquor was approximately two and two-thirds time as strong as a core containing two per cent. of liquor and no clay. This increase in strength is out of all proportion to the amount of clay used, since the strength which that amount of clay alone would lend, considered apart from the concentrated liquor, is hardly noticeable.

While the composition of matter herein described is particularly advantageous for the manufacture of cores for foundry purposes, it is also highly useful in other connections. Where it is to be employed as a binder for fuel briquets, it is obviously best not to use too large a proportion of clay since the clay increases the amount of ash of the briquet more than does sulfite liquor.

Mixtures of clay and sulfite liquor such as are herein disclosed are also useful in the manufacture of certain grades of paper, strawboard, and the like. Thus a pulp or paste of concentrated liquor and kaolin or clay (which may be white or colored,) may be added to the paper stock in the beater to give any degree of loading desired. The colloidal properties of the composition are peculiarly effective in securing complete and uniform distribution of the clay loading through the body of the paper fiber, while the adhesive qualities developed from the clay and liquor give strength and toughness to the finished paper. As concentrated sulfite liquor is dark in color, it should of course be decolorized before use where its natural coloring effect is undesirable. For many grades of paper manufactures however this tinting is unobjectionable. Pearl hardening or calcium sulfate may be used with the sulfite liquor either in place of or in conjunction with the clay; but clay owing to its special action, gives much the best results.

The material of the present invention is capable of use broadly in the plastics art. Paper pulp, asbestos, and similar fillers may be incorporated with the mixture of concentrated sulfite liquor and a plastic clay, and the resulting composition molded into useful articles of any desired shape. Or, the paper pulp or asbestos may be incorporated in the pulp-like mixture of argillaceous material and liquor to form a commercial binder or article. Fibrous materials such as these are desirable in the composite binder when used for some purposes. By molding into blocks and permitting the molded material to set under proper conditions, an artificial stone is produced which is suitable for certain purposes. Such artificial stone may be waterproofed if necessary in any convenient way, as by silicating its surface or coating with tarry compositions etc.

Cementitious materials may also be added to any of the foregoing composition where deemed advisable.

By replacing the lime in the concentrated sulfite liquor by alumina, a liquor containing soluble compounds of alumina with the organic constituents of the liquor is obtained which has even higher colloiding power than the concentrated liquor containing the original lignosulfonates. Such a product may be prepared by treating waste sulfite liquor with a solution of aluminum sulfate in amount equivalent to the lime present and removing the calcium sulfate produced. For some purposes it is advantageous to use this derived product in the mixtures above described. It is somewhat more expensive however than sulfite liquor which has been simply neutralized and concentrated, and as a rule the latter gives sufficiently good results.

As stated, further proportions of clay can be mixed with the described mixture of clay and concentrated sulfite liquor without detracting from its adhesive power and indeed with advantage. And the mixture is not unfavorably changed by contact with clay or loam, therein differing materially from ordinary cement; and it may therefore be used as a binder in plastic block and wall making with sands and gravels which are too clayey, loamy or dirty for use with Portland cement. It may indeed be used for structural purposes as a cementing binder for many clayey and earthy materials, producing walls or blocks of considerable strength. These walls or blocks may if necessary be waterproofed or painted. It is an excellent binder for dirt roads, producing a cement-like texture; and it is particularly useful with roads, blocks or walls carrying feldspathic rocks as it tends to produce hydrolytic changes with production of binding substances. This is particularly true with mixtures containing both feldspathic rocks and calcareous materials.

What I claim is:—

1. As a new plastic material, a mixture comprising sulfite liquor and a plastic clayey material of substantially neutral character pulped together.

2. As a new plastic material, a mixture comprising concentrated sulfite liquor and plastic clayey material of substantially neutral character pulped together.

3. As a new plastic material, a mixture comprising neutralized sulfite liquor and plastic clayey material of substantially neutral character pulped together.

4. As a new plastic material, a mixture comprising neutralized and concentrated sulfite liquor and plastic clayey material of substantially neutral character pulped together.

5. As a new plastic material, a mixture comprising sulfite liquor and plastic clayey material of substantially neutral character pulped together and bodies of inert finely divided material bound together by said liquor and clayey material.

6. As a new plastic material, a mixture comprising substantially equal proportions of concentrated sulfite liquor and a plastic clay pulped together.

7. As a new plastic material, a mixture comprising substantially equal proportions of concentrated sulfite liquor and a plastic clay pulped together and mixed with a filler.

8. As a new plastic material, a mixture comprising the organic matter of sulfite liquor and plastic clayey material of substantially neutral character in an intimately commingled condition.

9. As a new plastic material, a mixture comprising the organic matter of concentrated sulfite liquor and plastic clayey material of substantially neutral character in an intimately commingled condition.

10. The process of producing hard concrete-like masses which comprises treating a mixture containing feldspathic rocks and calcareous materials with a mixture comprising the organic matters of sulfite liquor and plastic argillaceous material of substantially neutral character.

11. As a new plastic material, a composition comprising organic matters derived from sulfite liquor, plastic argillaceous material, feldspathic material and calcareous material of substantially neutral character.

In testimony whereof, I affix my signature in the presence of two subscribing witnesses.

JACOB S. ROBESON.

Witnesses:
L. C. BOLLES,
JAS. A. SHIRRAS.